United States Patent [19]

Hall

[11] Patent Number: 5,423,292
[45] Date of Patent: Jun. 13, 1995

[54] SAFETY HARNESS FOR CHILDREN

[76] Inventor: Daniel J. Hall, 2516 Burn St., SE., Apt #201, Washington, D.C. 20020

[21] Appl. No.: 207,176

[22] Filed: Mar. 8, 1994

[51] Int. Cl.⁶ .............................................. A01K 29/00
[52] U.S. Cl. .................................................... 119/770
[58] Field of Search ................ 119/770, 792, 769, 795

[56] References Cited

U.S. PATENT DOCUMENTS

| | | | |
|---|---|---|---|
| D. 309,359 | 7/1990 | Joachim | D29/11 |
| 3,563,208 | 2/1971 | Nero | 119/170 |
| 4,563,981 | 1/1986 | Kramer | 119/770 |
| 4,638,764 | 1/1987 | Anderson | 119/96 |
| 4,854,607 | 8/1989 | Mandracchia et al. | 280/801 |
| 4,867,464 | 9/1988 | Cook | 280/33.993 |
| 4,879,972 | 11/1989 | Crowe et al. | 119/792 |
| 5,069,168 | 12/1991 | Roberson et al. | 119/96 |
| 5,119,767 | 6/1992 | Jimenez | 119/96 |

*Primary Examiner*—Thomas Price
*Attorney, Agent, or Firm*—Jacobson, Price, Holman & Stern

[57] ABSTRACT

At least one elongated strap with a plurality of cross-members extending transverse to the elongated strap and secured centrally to the elongated strap by stitching in a box pattern with a centrally-located X extending between opposite corners of the box. At the ends of the cross-members are rectangular metal or plastic rings which are secured in place on the cross-members by folding an end of the cross-members through the ring and stitching the end of the cross-member back onto itself. On an opposite side of the rectangular rings is a connection strap which passes through the ring and is secured by stitching on itself. The connection strap includes a VELCRO brand hook and loop type fastener which is passed around the wrist of a child and secures the child's wrist to the connection strap by the interconnection of the hook and loop fasteners. At one end of the elongated strap is a lead hook. At an opposite end of the elongated strap is a rectangular ring. The lead hook at the leading end of the elongated strap facilitates the interconnection of a plurality of elongated straps depending upon the number of children that are to be travelling as a group. Connected to the lead hook of the leading elongated strap is a lead leash having a rectangular ring which is removably secured to the lead hook. At the opposite end of the length of any number of elongated straps is a trailing leash having a hook which is removably securable to the ring at the trailing end of the last elongated strap.

6 Claims, 2 Drawing Sheets

5,423,292

SAFETY HARNESS FOR CHILDREN

FIELD OF THE INVENTION

This invention relates to the field of safety harnesses for restraining groups of children. The safety harness includes one or more elongated straps having wrist connection straps for children. The elongated straps are adapted to be secured to a lead leash and a trailing leash for controlling the movements of a plurality of children secured by the wrist to the elongated straps. The lead leash and trailing leash are held by two adults.

BACKGROUND OF THE INVENTION

Various products have been disclosed for controlling the movements of children when groups of children are taken out in public. Some of these devices are disclosed in the following patents.

U.S. Pat. No. 4,854,607 to Mandracchia et al. discloses a harness for small children. The harness is secured around the torso of a child and includes a tether connection secured to the harness unit. The harness unit is made up of a belt with a cable member included in its construction.

U.S. Pat. No. 5,069,168 to Roberson et al. discloses a child safety harness which is secured around the body of a child. The harness is connected by a tether to the wrist of an adult. The tether extends from a waist belt which extends around the lower section of the harness and the midsection of the child.

U.S. Pat. No. 4,867,464 to Cook discloses a child restraining safety belt or harness which is adapted to secure a child in a seat of a grocery cart. The safety device surrounds the torso of the child and is connected through the steel rungs of a grocery cart. A tether member is secured to the device to harness the child when the child is not in the shopping cart seat.

U.S. Pat. No. 5,119,767 Jimenez discloses a child safety device. The child is placed within the harness of the device. The device is compact and is used to distribute pressure evenly between the abdomen and the thorax of a child when secured in a vehicle.

U.S. Pat. No. 4,638,764 to Anderson discloses a security system for securing a small child to an adult. The system includes a strap having a loop on one end which is placed around the wrist of the child. The loop is adapted to maintain a fixed diameter regardless of a pulling force exerted by the child or parent. The other end of the strap is adapted to be attached to the parent.

U.S. Pat. No. 3,563,208 to Nero discloses a safety youth guider device. The device is used to maintain a plurality of organized marching children in a geometric orientation by the children holding on to handles which are secured to laterally-extending cross-members. The cross-members are constructed of rope having metal wire reinforcement.

U.S. Pat. No. Des. 309,359 to Joachim discloses a child safety harness designed to fit over the shoulders of a child.

SUMMARY OF THE INVENTION

The present invention is directed to the safety of children. When children are walking in a group, their safety is of a great concern. While travelling as a group, it is oftentimes very difficult to maintain control over the group and avoid potentially dangerous situations. This is especially true when a limited number of chaperons are available. In addition, when a group of children are out on an excursion, the children are confronted with numerous dangerous situations which are presented primarily by vehicular traffic or pedestrian traffic. In addition, it is possible the child could be separated from a group and the separation go unnoticed.

To address these problems, the present invention is designed to minimize, if not eliminate, the threat or risk of danger towards children travelling in a group. This invention also minimizes the number of chaperons required for an outing by a group of children.

The invention enables a group of children to be escorted safely by fastening a strap around the child's wrist. The strap is removably mounted on the wrist so the child is quickly secured to the group and is also releasable from the group upon arrival at a desired destination.

The present invention includes at least one elongated strap with a plurality of cross-members extending transverse to the elongated strap and secured centrally to the elongated strap by stitching in a box pattern with a centrally-located X extending between opposite corners of the box. At the ends of the cross-members are rectangular metal or plastic rings which are secured in place on the cross-members by folding an end of the cross-members through the ring and stitching the end of the cross-member back onto itself. On an opposite side of the rectangular rings is a connection strap which passes through the ring and is secured by stitching on itself. The connection strap includes a VELCRO brand, two-part hook and loop type fastener which is passed around the wrist of a child and secures the child's wrist to the connection strap by the interconnection of the hook and loop fasteners.

At one end of the elongated strap is a lead connector hook. At an opposite end of the elongated strap is a rectangular connector ring. The lead connector hook at the leading end of the elongated strap facilitates the interconnection of a plurality of elongated straps depending upon the number of children that are to be travelling as a group.

Connected to the lead connector hook of the leading elongated strap is a lead leash having a rectangular connector ring which is removably secured to the lead connector hook. At the opposite end of the length of any number of elongated straps is a trailing leash having a connector hook which is removably securable to the connector ring at the trailing end of the last elongated strap.

In addition to the use of one or more elongated straps, a folding stop sign is used in combination with the present invention to signal to the children that they are to stop as a group. The stop sign should preferably be held by the lead adult. In addition, a tote bag is used to carry all of the elongated straps, lead leash, trailing leash and stop sign.

It is an object of the present invention to provide an elongated strap having a plurality of transverse cross-members to which are secured a connection strap at each end of the cross-members.

it is yet another object of the present invention to provide an elongated strap having a plurality of transverse cross-members to which are secured a connection strap at each end of the cross-members with a lead leash and a trailing leash removably secured to the elongated strap.

It is still yet another object of the present invention to provide an elongated strap having a plurality of transverse cross-members to which are secured a connection strap at each end of the cross-members with a lead leash and a trailing leash removably secured to the elongated strap with a plurality of elongated straps being interconnectable to increase the number of connection straps located between the lead leash and trailing leash to increase the number of children being escorted by two adults.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
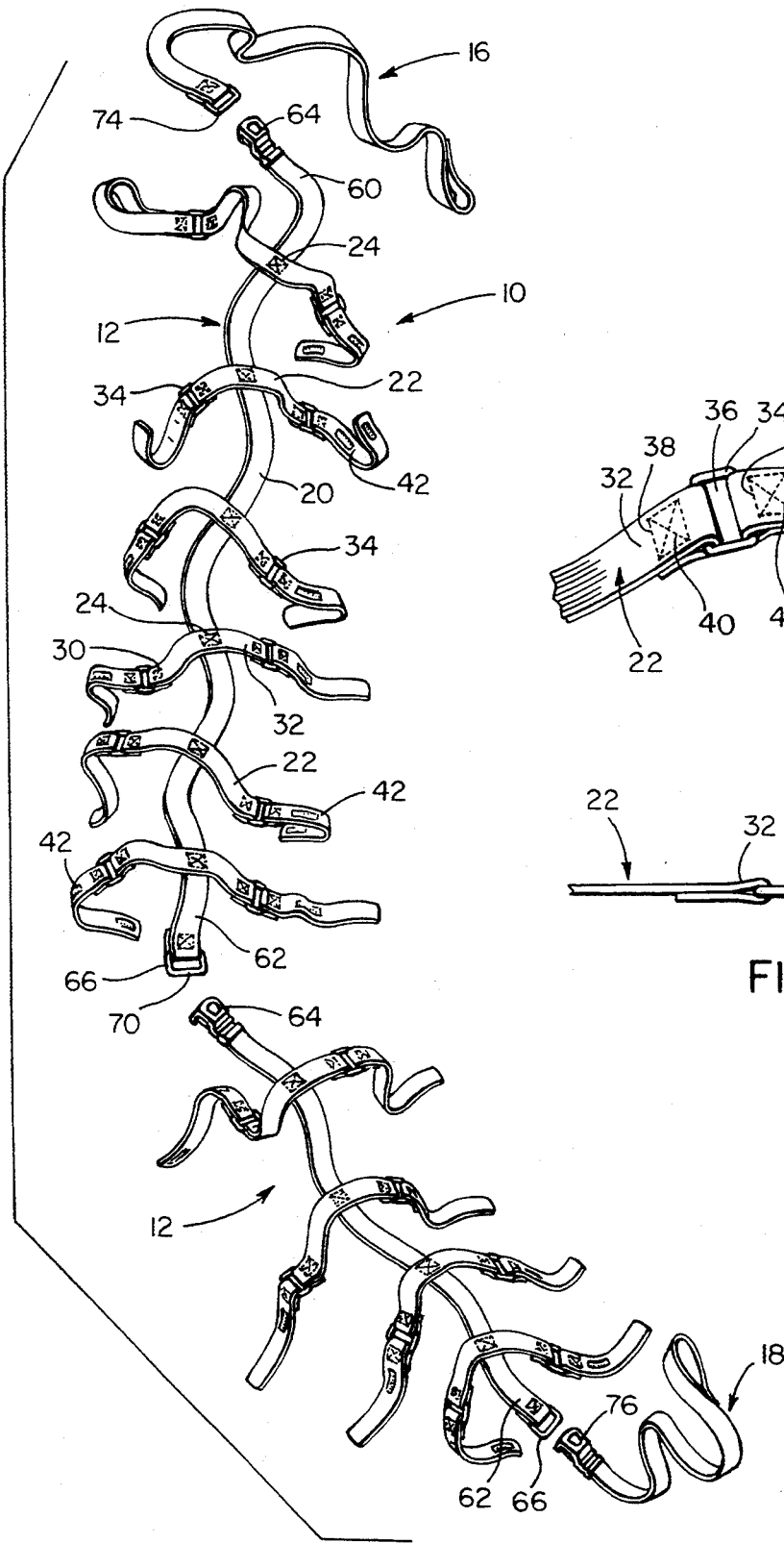
FIG. 1 is an exploded view of two elongated straps, a lead leash and a trailing leash.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 6, in particular, a safety harness embodying the teachings of the subject invention is generally designated as 10. With reference to its orientation in FIG. 1, the safety harness includes at least one elongated strap 12, a lead leash 16 and a trailing leash 18.

Figure 4:
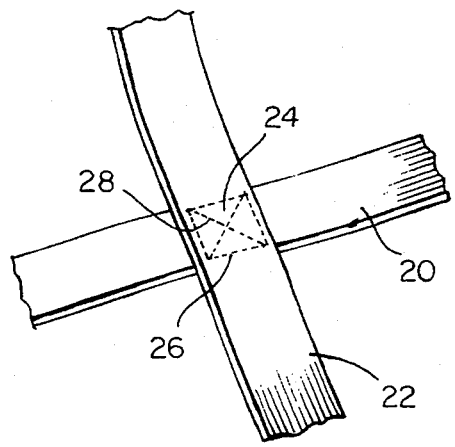
FIG. 4 is an enlarged view of the connection of a cross-member to an elongated strap.

Each elongated strap 12 includes a central member 20, made of nylon and extending for a length of seventy-two inches for use with up to 12 children and for a length of forty-eight inches for use with up to 8 children and a width of one inch. A plurality of cross-members 22 are secured to the central member 20 at a center portion 24 of the cross-members 22. Each cross-member is made of nylon and is twelve inches long and one inch wide. As shown in FIG. 4, the cross-member is secured to the central member 20 by stitching in a box pattern stitch 26 with an X pattern stitch 28 extending through the box pattern stitch 26 for a secure interconnection of the cross-member 22 to the central member 20.

Figure 2:
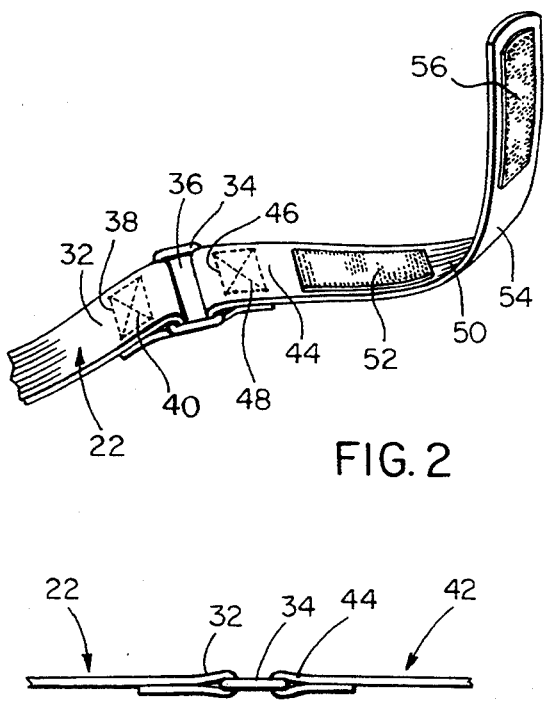
FIG. 2 is an enlarged view of a connection strap interconnected with one end of a cross-member connected to an elongated strap.
Figure 3:
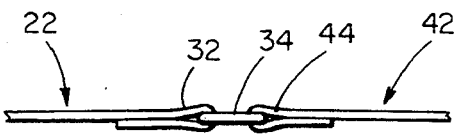
FIG. 3 is an enlarged side view of the interconnection of a connection strap and an end of a cross-member.

At the opposite ends 30, 32 of each cross-member 22 is secured a rectangular ring 34 as illustratively shown in FIG. 3 with respect to end 32 of cross-member 22, it being understood that a similar arrangement is located at end 30 of each cross-member 22. As shown in FIG. 2 and 3, end 32 of the cross-member 22 is passed through an opening 36 defined by approximately one inch wide rectangular ring 34, made of metal or plastic, and the end of the cross-member is folded upon itself and secured by a box pattern stitch 38 within which is an X pattern stitch 40.

On an opposite side of the ring 34 is secured a connection strap 42, having one end 44 passing through the opening 36 of the ring 34 to be secured upon itself by box pattern stitch 46, having an X pattern stitch 48 contained therein. Each connection strap 42 is seven inches long and one inch wide and made of nylon.

Figure 6:
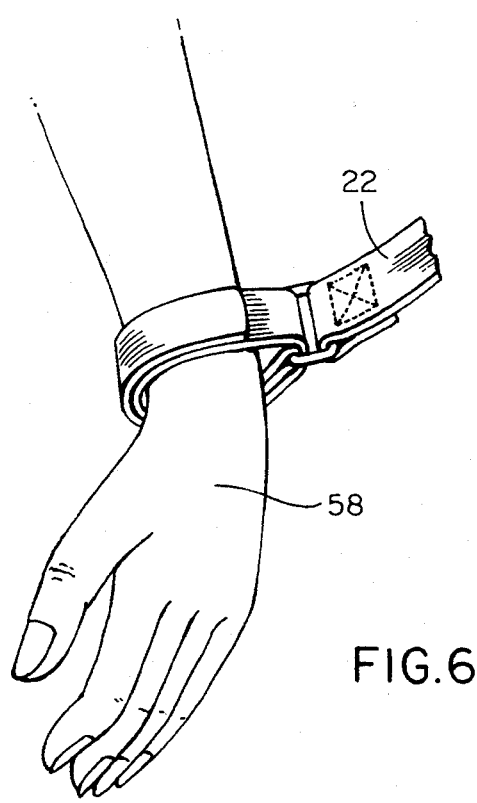
FIG. 6 illustrates the securing of a wrist of a child by the connection strap.
Figure 7:
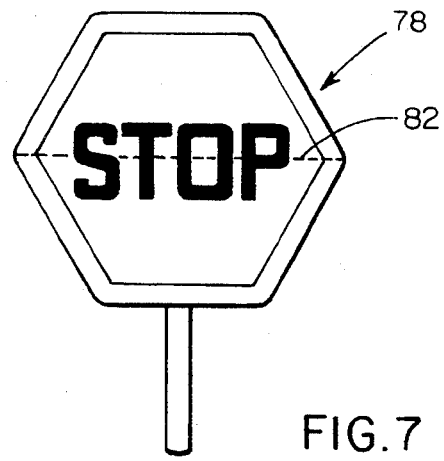
FIG. 7 illustrates a stop sign used in conjunction with the present invention.
Figure 8:
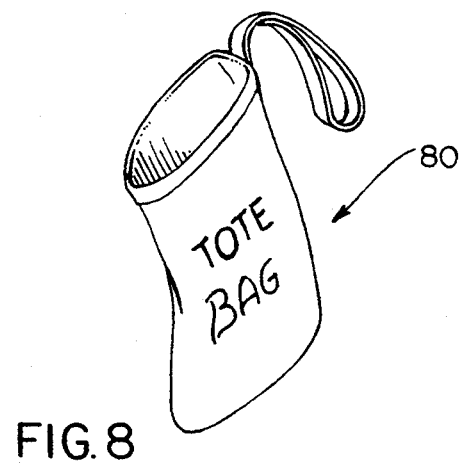
FIG. 8 illustrates a tote bag for carrying the at least one elongated strap, lead leash, trailing leash and stop sign of the present invention.

Located on one surface 50 of the connection strap is rectangular loop fastener section 52, which is one part of a two-part hook and loop fastener. On an opposite surface 54 is located rectangular hook fastener section 56, which is the other part of the two-part hook and loop fastener. To secure the wrist 58 of a child to the elongated strap 12, the connection strap 42 is placed around the wrist 58 of a child and the hook fastener section 56 is engaged with the loop fastener section 52 to form a secure fastening of the connection strap around the wrist of a child as shown in FIG. 6.

At opposite ends 60, 62 of each elongated strap 12 are a lead connector hook 64 and trailing connector ring 66, respectively. If it is desired to connect more than one elongated strap 12 in a row, with reference to FIG. 1, a lead connector hook 64 is removably secured to a trailing connector ring 66 so as to secure the two elongated straps 12 together.

Figure 5:
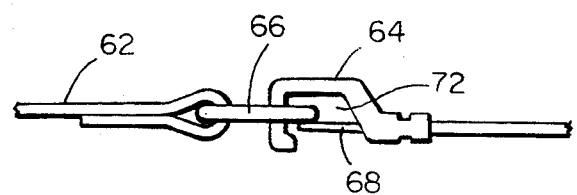
FIG. 5 is an enlarged view of the removable connection between one end of an elongated strap and a lead leash, an interconnection between two elongated straps, or an interconnection between an end of an elongated strap and a trailing leash.

As shown in FIG. 5, a lead connector hook 64 having a biased member 68 is used to pass through an opening 70 of the trailing connector ring 66 to push the biased member 68 rearwardly until the biased member 68 can pass a side of the trailing connector ring 66 and thereby secure the trailing connector ring 66 within an opening 72 of the lead connector hook 64. The lead connector hook is preferably made of plastic and is two inches long and one inch wide. The trailing connector ring 66 is one inch wide.

Similar to the connection shown in FIG. 5, the lead leash 16, which is twenty-four inches long and one inch wide and made of nylon, includes a rectangular connector ring 74 which is connectable to a lead connector hook 64 at an end 60 of elongated strap 12. Similarly, trailing leash 18, which is twenty-four inches long, one inch wide and made of nylon, includes a connector hook 76 which can engage a connector ring 66 located at an end 62 of the last elongated strap 12 in a series of at least one elongated straps 12.

As an optional accessory for use with the present invention which includes an elongated strap 12, a lead leash 16 and trailing leash 18, a foldable stop sign 78, which is foldable along fold line 82 and measuring eighteen inches across and made of nylon and plastic, is usable to indicate to the group of children secured to the elongated strap 12 that the group should stop at a particular location. In addition, a tote bag 80 made of nylon and measuring twenty inches deep and twelve inches wide is usable for storing stop sign 78 as well as one or more elongated straps 12, lead leash 16 and trailing leash 18.

By the present invention, a group of children are securely connected to an elongated strap for travelling in a group. The elongated strap includes opposite ends with means for securing with a complementary-shaped connector of a lead leash and a trailing leash.

Having described the invention, many modifications thereto will become apparent to those skilled in the art to which it pertains without deviation from the spirit of the invention as defined by the scope of the appended claims.

I claim:

1. A safety harness for children, said safety harness comprising:
    at least one elongated strap having a central member with a leading end and a trailing end, and a plurality of cross-members secured to said central member,
    each cross-member including two ends,
    a plurality of connection straps,
    each end of said cross-members having a connection means for securing an end of one of said plurality of connection straps to one end of said two ends of said cross member,
    a two-part hook and loop fastener spaced along each of said plurality of connection straps for wrapping of each connection strap around a wrist of a child and securing of said connection strap to said wrist of a child by an interconnection of said two-part hook and loop fastener,
    two connectors,
    one connector of said two connectors being located at said leading end of said elongated strap, and the other connector being located at said trailing end of said elongated strap,
    a lead leash having a handle end and a connector about an opposite end connected to said leading end of said strap, and
    a trailing leash having a handle end and a connector about an opposite end connected to said trailing end of said strap.

2. A safety harness for children as claimed in claim 1, wherein there are two of said elongated strap connected together.

3. A safety harness for children as claimed in claim 1, wherein said connection means is a ring.

4. A safety harness for children as claimed in claim 3, wherein one end of each cross-member passes through said ring and is secured upon itself.

5. A safety harness for children as claimed in claim 1, wherein said one connector is a hook having a biased member.

6. A safety harness for children as claimed in claim 1, wherein said other connector is a ring.

* * * * *